(12) United States Patent
Hill

(10) Patent No.: US 7,054,077 B2
(45) Date of Patent: May 30, 2006

(54) METHOD FOR CONSTRUCTING A CATADIOPTRIC LENS SYSTEM

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 26 days.

(21) Appl. No.: 10/816,201

(22) Filed: Apr. 1, 2004

(65) Prior Publication Data

US 2004/0228008 A1    Nov. 18, 2004

Related U.S. Application Data

(60) Provisional application No. 60/459,493, filed on Apr. 1, 2003.

(51) Int. Cl.
G02B 17/00 (2006.01)
G02B 3/08 (2006.01)

(52) U.S. Cl. ...................... 359/726; 359/741
(58) Field of Classification Search ............. 351/726, 351/741; 359/726, 741
See application file for complete search history.

(56) References Cited

U.S. PATENT DOCUMENTS

| | | | |
|---|---|---|---|
| 531,994 A * | 1/1895 | Gathmann | 359/741 |
| 3,628,027 A | 12/1971 | Brauss | |
| 3,748,015 A | 7/1973 | Offner | |
| 4,011,011 A | 3/1977 | Hemstreet et al. | |
| 4,226,501 A | 10/1980 | Shafer | |
| 4,272,684 A | 6/1981 | Seachman | |
| 4,685,803 A | 8/1987 | Sommargren | |
| 4,733,967 A | 3/1988 | Sommargren | |
| 5,220,403 A | 6/1993 | Batchelder et al. | |
| 5,241,423 A | 8/1993 | Chiu et al. | |
| 5,327,223 A | 7/1994 | Korth | |
| 5,485,317 A | 1/1996 | Perissinotto et al. | |
| 5,602,643 A | 2/1997 | Barrett | |
| 5,614,763 A | 3/1997 | Womack | |
| 5,633,972 A | 5/1997 | Walt et al. | |
| 5,659,420 A | 8/1997 | Wakai | |
| 5,699,201 A | 12/1997 | Lee | |
| 5,760,901 A | 6/1998 | Hill | |
| 5,828,455 A | 10/1998 | Smith et al. | |
| 5,894,195 A | 4/1999 | McDermott | |
| 5,915,048 A | 6/1999 | Hill et al. | |
| 6,052,231 A | 4/2000 | Rosenbluth | |

(Continued)

FOREIGN PATENT DOCUMENTS

JP          61067002 A  *  4/1986

OTHER PUBLICATIONS

U.S. Appl. No. 09/852,369, filed Jan. 3, 2002, Hill.

(Continued)

*Primary Examiner*—Scott J. Sugarman
(74) *Attorney, Agent, or Firm*—Wilmer Cutler Pickering Hale and Dorr

(57) ABSTRACT

A method of fabricating a catadioptric lens system, the method involving: fabricating a single catadioptric lens element having a bottom surface and an upper surface, the upper surface having a convex portion and a concave portion, both the convex and concave portions sharing a common axis of symmetry; cutting apart the catadioptric lens element to form 2n pie-shaped segments, wherein n is an integer; and reassembling the 2n pie-shaped segments to form the catadioptric lens system with n of the 2n pie-shaped segments being located above a common plane and the rest of the 2n pie-shaped elements being below the common plane.

21 Claims, 10 Drawing Sheets

U.S. PATENT DOCUMENTS

| | | | |
|---|---|---|---|
| 6,091,496 | A | 7/2000 | Hill |
| 6,124,931 | A | 9/2000 | Hill |
| 6,271,923 | B1 | 8/2001 | Hill |
| 6,330,065 | B1 | 12/2001 | Hill |
| 6,445,453 | B1 | 9/2002 | Hill |
| 6,447,122 | B1 | 9/2002 | Kobayashi et al. |
| 6,480,285 | B1 | 11/2002 | Hill |
| 6,552,805 | B1 | 4/2003 | Hill |
| 6,552,852 | B1 | 4/2003 | Hill |
| 6,597,721 | B1 | 7/2003 | Hutchinson et al. |
| 6,606,159 | B1 | 8/2003 | Hill |
| 6,667,809 | B1 | 12/2003 | Hill |
| 6,714,349 | B1 | 3/2004 | Nam |
| 6,717,736 | B1 | 4/2004 | Hill |
| 6,753,968 | B1 | 6/2004 | Hill |
| 6,775,009 | B1 | 8/2004 | Hill |
| 6,847,029 | B1 | 1/2005 | Hill |
| 6,847,452 | B1 | 1/2005 | Hill |
| 2002/0074493 | A1 | 6/2002 | Hill |
| 2003/0174992 | A1 | 9/2003 | Levene |
| 2004/0201852 | A1 | 10/2004 | Hill |
| 2004/0201853 | A1 | 10/2004 | Hill |
| 2004/0201854 | A1 | 10/2004 | Hill |
| 2004/0201855 | A1 | 10/2004 | Hill |
| 2004/0202426 | A1 | 10/2004 | Hill |
| 2004/0227950 | A1 | 11/2004 | Hill |
| 2004/0227951 | A1 | 11/2004 | Hill |
| 2004/0228008 | A1 | 11/2004 | Hill |
| 2004/0246486 | A1 | 12/2004 | Hill |
| 2004/0257577 | A1 | 12/2004 | Hill |

OTHER PUBLICATIONS

U.S. Appl. No. 09/917,402, filed Jul. 27, 2001, Hill.
U.S. Appl. No. 10/765,368, filed Jan. 27, 2004, Hill.
U.S. Appl. No. 60/442,858, filed Jul. 27, 2002, Hill.
U.S. Appl. No. 60/442,982, filed Jan. 29, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/459,425, filed Apr. 11, 2003, Hill.
U.S. Appl. No. 60/460,129, filed Apr. 3, 2003, Hill.

* cited by examiner

METHOD FOR CONSTRUCTING A CATADIOPTRIC LENS SYSTEM

This application also claims the benefit of U.S. Provisional Application No. 60/459,493, filed Apr. 1, 2003.

TECHNICAL FIELD

This invention relates to a method for making catadioptric lens systems for such applications as interferometric confocal microscopy.

BACKGROUND OF THE INVENTION

A number of different applications of catadioptric imaging systems for far-field and near-field interferometric confocal microscopy have been described such as in U.S. patent applications Ser. No. 10/028,508, filed Dec. 20, 2001 [ZI-38], and No. 10/366,651, filed Feb. 3, 2003 [ZI-43] entitled "Catoptric And Catadioptric Imaging Systems;" U.S. Provisional Patent Application No. 60/447,254, filed Feb. 13, 2003 and U.S. patent application Ser. No. 10/778,371, filed Feb. 13, 2004 [ZI-40] both entitled "Transverse Differential Interferometric Confocal Microscopy," U.S. Provisional Patent Application No. 60/448,360, filed Feb. 19, 2003 and U.S. patent application Ser. No. 10/782,057, filed Feb. 19, 2004 [ZI-41] both entitled "Longitudinal Differential Interferometric Confocal Microscopy for Surface Profiling;" U.S. Provisional Patent Application No. 60/448,250 and U.S. patent application Ser. No. 10/782,058, filed Feb. 19, 2004 [ZI-42] both entitled "Method and Apparatus for Dark Field Interferometric Confocal Microscopy;" U.S. Provisional Patent Application No. 60/442,982, filed Jan. 28, 2003 and U.S. patent application Ser. No. 10/765,229, filed Jan. 27, 2004 [ZI-45] both entitled "Interferometric Confocal Microscopy Incorporating Pinhole Array Beam-Splitter;" and U.S. Provisional Application No. 60/459,425, filed Apr. 1, 2003 and U.S. patent application Ser. No. 10/816,180, filed Apr. 1, 2004 [ZI-50] both entitled "Joint Measurement Of Fields Of Orthogonally Polarized Beams Scattered/Reflected By An Object In Interferometry." The above-mentioned patent applications and provisional patent applications are all by Henry A. Hill and the contents are incorporated herein by reference in their entirety.

In each of the applications of catadioptric imaging systems for each of the cited U.S. patent applications and U.S. Patent Provisional Patent Applications, tight tolerances are placed on the manufacture of optical elements. In addition to the tolerances normally encountered in designing a diffraction limited imaging system, there are tolerances imposed by the interferometric confocal microscopy applications. The additional tolerances are for example on radii of curvature of certain lens elements with respect to radii of curvature of certain other lens elements and on relative locations of centers of curvature of lens elements.

The additional tolerances lead to improved performance of a catadioptric imaging system, e.g., with respect to increasing the average intensity of desired images by a factor of approximately 2 or more and reduced intensity of spurious beams by one or more orders of magnitude, and in addition make it possible to realize interferometric reduction of background fields. The interferometric reduction of background fields leads to a reduction of statistical errors. The increase in intensity of desired images and the reduction of statistical errors lead to an increase in signal-to-noise ratios and to a concomitant increase in through put of a metrology tool using the catadioptric imaging system. The interferometric reduction of background fields further leads to a reduction systematic errors. A consequence of the reduction of systematic errors is a reduction of the computational task required to invert arrays of interference signal values to a multi-dimensional image of an object.

SUMMARY OF THE INVENTION

In general, in one aspect the invention features a method of fabricating a catadioptric lens system. The method involves: fabricating a single catadioptric lens element having a bottom surface and an upper surface, the upper surface having a convex portion and a concave portion, both the convex and concave portions sharing a common axis of symmetry; cutting apart the catadioptric lens element to form 2n pie-shaped segments, wherein n is an integer; and reassembling the 2n pie-shaped segments to form the catadioptric lens system with n of the 2n pie-shaped segments being located above a common plane and the rest of the 2n pie-shaped elements being below the common plane.

Other embodiments include one or more of the following features. Cutting the catadioptric lens element to form the 2n pie-shaped segments is accomplished by cutting along a set of planes each of which contains the common axis. The 2n pie-shaped segments are identically shaped. The parameter n=1 or 2. Each of the four pie-shaped segments is a 90° segment of the single catadioptric lens element. Reassembling involves arranging each of the n pie-shaped segments that are above the common plane to be opposite to and aligned with a corresponding different one of the n pie-shaped segments that are below the common plane. The convex portion is a reflective portion of the catadioptric lens element and the concave portion is a refractive portion of the catadioptric lens element. Reassembling the four pie shaped segments relative to a common plane involves placing two of the four segments are above the plane with their bottom surfaces being substantially parallel to and facing the common plane and placing the other two of the four segments are below the common plane with their bottom surfaces substantially parallel to and facing the common plane. Reassembling also involves orienting the four segments so that each one of the two segments above the common plane are aligned with and adjacent to a corresponding one of the two segments that are below the common plane. Reassembling further involves orienting the two segments that are above the common plane so that they share an axis of symmetry and are radially opposite each other relative to that shared axis of symmetry.

In general, in another aspect, the invention features another method of fabricating a catadioptric lens system. The method involves: fabricating a single catadioptric lens element having a bottom surface and an upper surface, the upper surface having a convex portion and a concave portion, both the convex and concave portions sharing a common axis of symmetry; cutting apart the catadioptric lens element to form two identically pie-shaped segments; and reassembling the two pie-shaped segments to form at least part of the catadioptric lens system with one of the two pie-shaped segments being located above a common plane and the other of the two pie-shaped elements being below the common plane, wherein the bottom surfaces of the two pie-shaped elements are facing each other and substantially parallel to the common plane, and wherein the two pie-shaped segments are aligned with each other.

In general, in still another aspect, the invention features another method of fabricating a catadioptric lens system. The method involves: fabricating a single catadioptric lens element having a bottom surface and an upper surface, the upper surface having a convex portion and a concave portion, both the convex and concave portions sharing a common axis of rotational symmetry; cutting apart the catadioptric lens element to form four substantially identical segments, wherein cutting involves cutting the catadioptric element along at least one plane that contains the common axis; and reassembling the four segments to form the catadioptric lens system with two of the four segments being located above a common plane and the other two of the four elements being below the common plane, wherein the reassembled four segments have their bottom surfaces substantially parallel to the common plane, and wherein each of the two segments that is above the plane is aligned with and adjacent to a corresponding different one of the two segments that are below the common plane.

An advantage of one or more embodiments is a reduction of cost in the manufacture of lens elements for a catadioptric imaging system in interferometric confocal microscopy.

Another advantage of one or more embodiments is the improvement of performance of a catadioptric imaging system in interferometric confocal microscopy.

Another advantage of one or more embodiments is the increase of the average intensity of desired images by a factor of approximately 2 or more.

Another advantage of one or more embodiments is a reduction of intensity of spurious beams by one or more order of magnitudes, Another advantage of one or more embodiments is that it makes it possible to realize interferometric reduction of background fields.

Another advantage of one or more embodiments is an increase in signal-to-noise ratios and to a concomitant increase in through put of a metrology tool using a catadioptric imaging system.

Another advantage of one or more embodiments is a reduction systematic errors as a consequence of the interferometric reduction of background fields.

Another advantage of one or more embodiments is the reduction of the computational task required to invert arrays of interference signal values to a multi-dimensional image of an object wherein the arrays of interference signal values are obtained with an interferometric confocal microscopy system that uses a catadioptric imaging system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
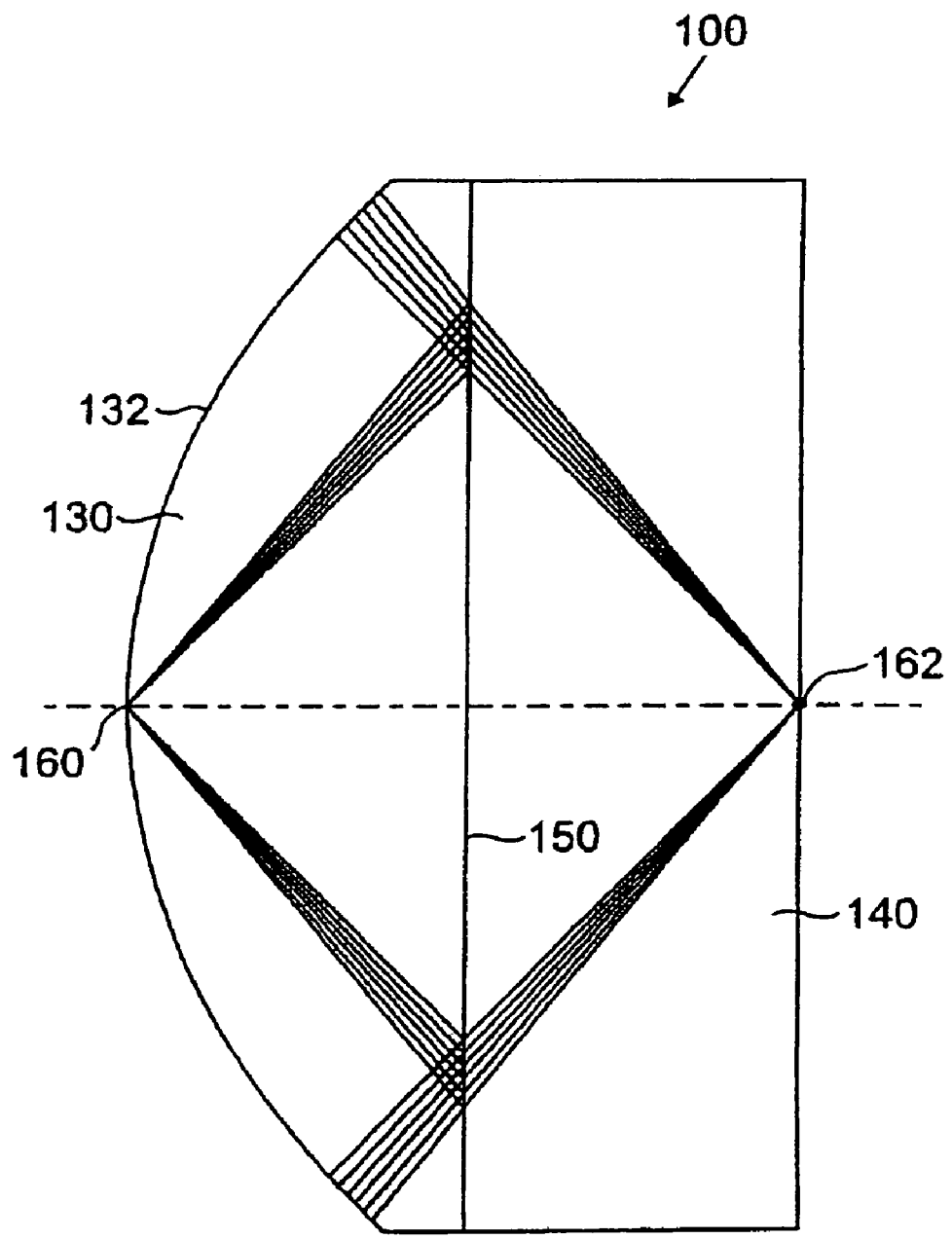
FIG. 1 is a schematic drawing of a catoptric imaging system including a reflective surface and a beam splitter.

Referring to FIG. 1, a catoptric imaging system 100 includes an object point 160, an image point 162, a beam splitter 150, a curved reflective surface 132, and light transmitting elements 130 and 140. Light emanating from the object point 160 passes through the light transmitting element 130 and is incident on the beam splitter 150. The beam splitter 150 reflects and transmits portions of the incident light beams. In the presently described embodiment, the portion of light that is initially transmitted is ignored and it is omitted from FIG. 1. The reflected portion is shown in FIG. 1 and is incident onto the reflective surface 132. The surface 132 is constructed such that each light ray emanating from the object point 160 that is reflected from the beam splitter 150 and incident onto the surface 132 is reflected to the image point 162 after being transmitted by the beam splitter 150. In other words, light emanating from the object point 160 is focused onto the image point 162 by the following path: i) light is emanated from the object point 160; ii) reflected by beam splitter 150; iii) reflected by reflective surface 132; iv) transmitted by the beam splitter 150; and v) converges onto the image point 162.

Because reflecting surface 132 causes the focusing of the rays to the image point, and not refraction by media 130 and 140, the image plane is independent of the spectral region used in image formation (provided that media 130 and 140 do not substantially differ in index). In other words, there is no longitudinal chromatic aberration. Accordingly, a large spectral range can be used for image formation.

The index of refraction of medium 130 impacts the numerical aperture of the system. In particular, the numerical aperture of system 100 scales linearly with the index of refraction of the medium 130. Although by no means limiting, the rest of this discussion assumes that the indices of refraction for elements 130 and 140 (and their analogs in other embodiments) are substantially the same.

In one embodiment, the features of system 100 are achieved with the following design. Given the object point 160 and the image point 162, beam splitter 150 is positioned to lie in the plane defined by points that are equidistant from the object and image points. Furthermore, reflective surface 132 is designed to be concentric with the image point 162. As a result of this construction, a light ray emanating from the object point at an angle φ is incident on the beam splitter at some point P with an angle of incidence of φ. By design light is incident onto surface 132 at a normal angle of incidence and therefore such light rays are reflected through 180 degrees. Furthermore, after reflection from surface 132, the light is incident on the beam splitter at the same point P with angle of incidence of φ and after transmission by the beam splitter 150 the light ray is incident on the image point with angle of incidence of φ.

As described above, the light incident on the image point is both reflected and transmitted by the beam splitter surface. Therefore, the light reaching image point 162 is proportional to R(φ)T(φ), where R and T are the reflection and transmission coefficients of beam splitter 150, respectively. Both of these coefficients are typically dependent on the angle of incidence. Using techniques known in the art, beam splitter 150 is designed such that for some angle φ' beam splitter 150 is ideal. That is, for some angle φ', R(φ')≅T(φ')≅0.5. As the angle of incidence differs from φ', the coefficients will often demonstrate non-ideal beam splitter behavior. Specifically, the behavior deviates from the ideal by some $\delta(\phi)$, and $R(\phi)=0.5+\delta(\phi-\phi')$ and $T(\phi)=1-R(\phi)=0.5-\delta(\phi-\phi')$ where $\delta(0)=0$. Because the light rays incident on image point 162 as shown in FIG. 1 are both reflected and transmitted, then $T(\phi)R(\phi)=0.25-\delta(\phi-\phi')^2$. Thus even though the beam splitter may deviate from an ideal beam splitter with some deviation $\delta(\phi)$, the non-ideal behavior will only impact the light intensity to second order in $\delta(\phi)$.

Furthermore, this embodiment has an object point image that is diffraction limited. Although other points in the object plane may not be diffraction limited, there does exist a planar disc centered on the object point and parallel with the beam splitter 150 whose image is also a flat disc of the same radius. In other words, the image plane is flat and the magnification is 1.

Element 130 and surface 132 may be made in a number of ways. Transmitting element 130 and the reflecting surface 132 may be made from a solid light-transmitting medium (e.g. fused silica). In this case, the solid light-transmitting medium can be shaped to have one side that is to match the shape of the beam splitter 150 and another side whose shape matches the desired shape for reflecting surface 132. By suitably depositing a reflecting film onto the curved surface, the reflecting surface 132 is formed. This could be accomplished using any of the well-known techniques in the art for forming reflecting films. The reflecting film is not applied within some neighborhood of the object point 160 (not shown). Instead the surface near the object point would be constructed to allow light rays to enter into the imaging system. For example, an antireflection coating may be applied to surface 132 in the vicinity of object point 160. Such an aperture allows light rays from the object point to enter into the imaging system.

In another embodiment, light-transmitting element 130 may be a hollow region of vacuum or filled with a light transmitting gas or fluid. In such embodiments, the reflective surface 132 may be formed onto some mechanically supporting substrate (not shown) and its external surface is either intrinsically reflective (e.g. a polished metal surface) or is made reflective by application of a reflective film. Furthermore, an aperture is formed in the vicinity of the object point 160 such that light can enter the imaging system (not shown).

In other embodiments, the reflecting surface 132 may be a non-smooth and/or discontinuous surface. For example, the reflecting surface may be formed by an array of flat reflecting surfaces positioned to be substantially concentric with the image point 162 so as to provide the same optical function as the surface 132 in FIG. 1. Furthermore reflecting surface 132 may have deviations from a concentric shape (e.g. elliptical or parabolic). Such deviations may be useful in correcting for higher order aberrations.

In some embodiments of system 100, element 130 is a high-index material and element 130 and beam splitter 150 are positioned such that element 130 contacts object point 160 to thereby maximize the numerical aperture of the imaging system. This is a non-limiting case, however, and in other embodiments the object point need not contact element 130. Similarly, element 140 need not contact image point 160. Moreover, in subsequently described embodiments, the object point and/or the image point need not contact an element of the imaging system, although, depending on the embodiment, this may be preferable to maximize numerical aperture.

Although not intended to be limiting in any way, as a theoretical curiosity it is noteworthy to point out that imaging system 100 functions equivalently to a pair of planar elements each having opposite indices of refraction (i.e., one element having a positive index +n, and the other element having a negative index —n). In particular, refraction at the interface between two such elements causes light rays emitted from the object point to bend and focus to the image point. This can be seen from a trivial application of Snell's law of refraction. Such bending and focusing is effectively achieved in system 100 by the initial reflection from beam splitter 150 and the subsequent reflection by reflecting surface 132. A similar effect is also present in the subsequently described embodiments.

Figure 2:
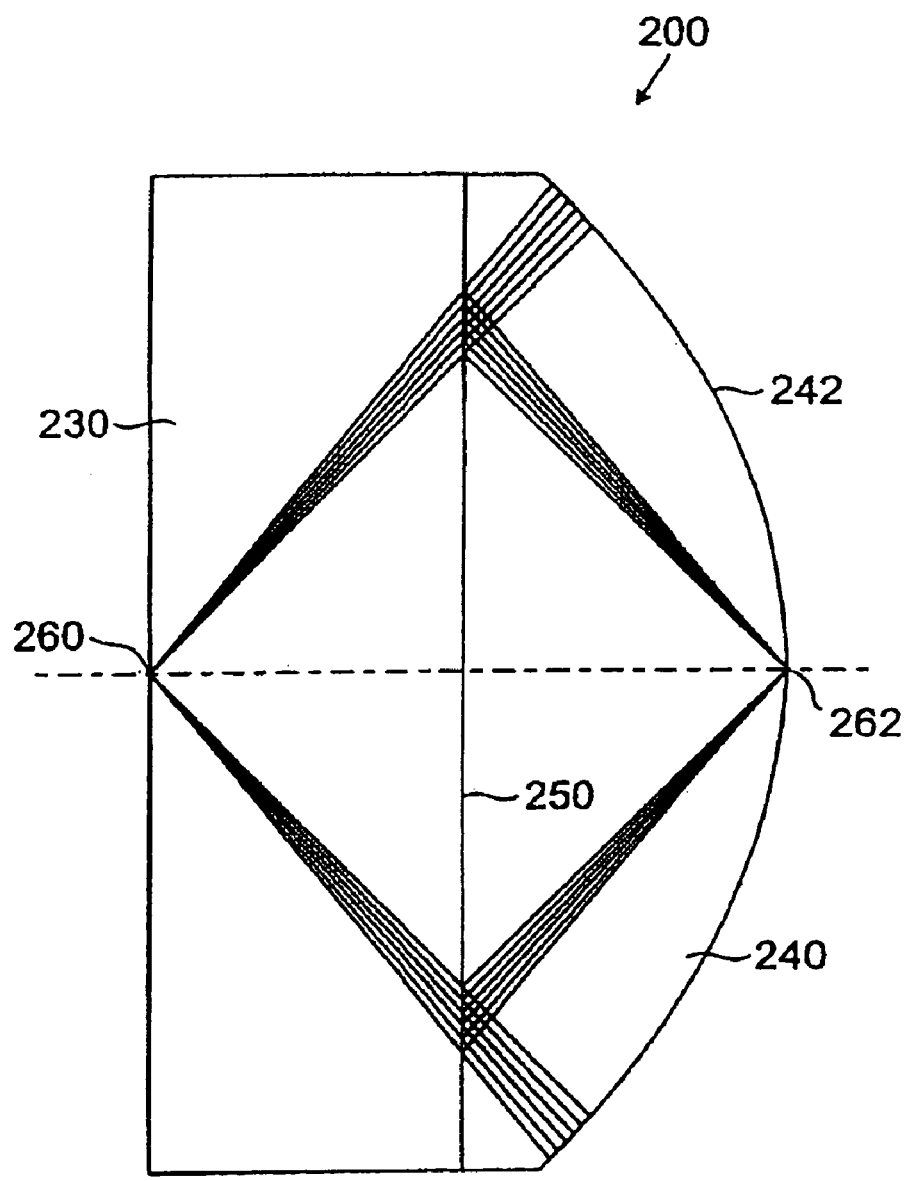
FIG. 2 is a schematic drawing of another catoptric imaging system including a reflective surface and a beam splitter.

From the design of imaging system 100, it is clear that light that initially is transmitted by the beam splitter is ignored and only the reflected component is used. Other imaging systems can be designed such that the initially transmitted component is utilized and the reflected component is discarded. Referring to FIG. 2, a catoptric imaging system 200 includes an object point 260, an image point 262, a beam splitter 250, a curved reflective surface 242, and light transmitting media 230 and 240. The embodiment of FIG. 2 is similar to that of FIG. 1 except that in the embodiment of FIG. 2, reflecting surface 242 is positioned to receive light transmitted by the beam splitter surface, whereas the reflecting surface in FIG. 1 is positioned to receive light reflected by the beam splitter surface. In an embodiment of system 200, the reflecting surface 242 is concentric with object point 160. As is the case with the embodiment in FIG. 1, the intensity of incident light imaged to image point 262 is proportional to $T(\phi)R(\phi)=0.25-\delta(\phi-\phi')^2$. Thus the image point light intensity has no first order deviations due to non-ideal beam splitter behavior. Furthermore, as described with reference to FIG. 1 a transparent window or an apertures in surface 242 allows access to the image point 262 for light emanating from object point 132.

In the embodiments of FIGS. 1 and 2, although the object point is diffraction limited, the points in the vicinity of the object point may not be. Such points may suffer from certain optical aberrations. Such aberrations may be corrected for a large part of the object plane by introducing refractive surfaces.

Figure 3:
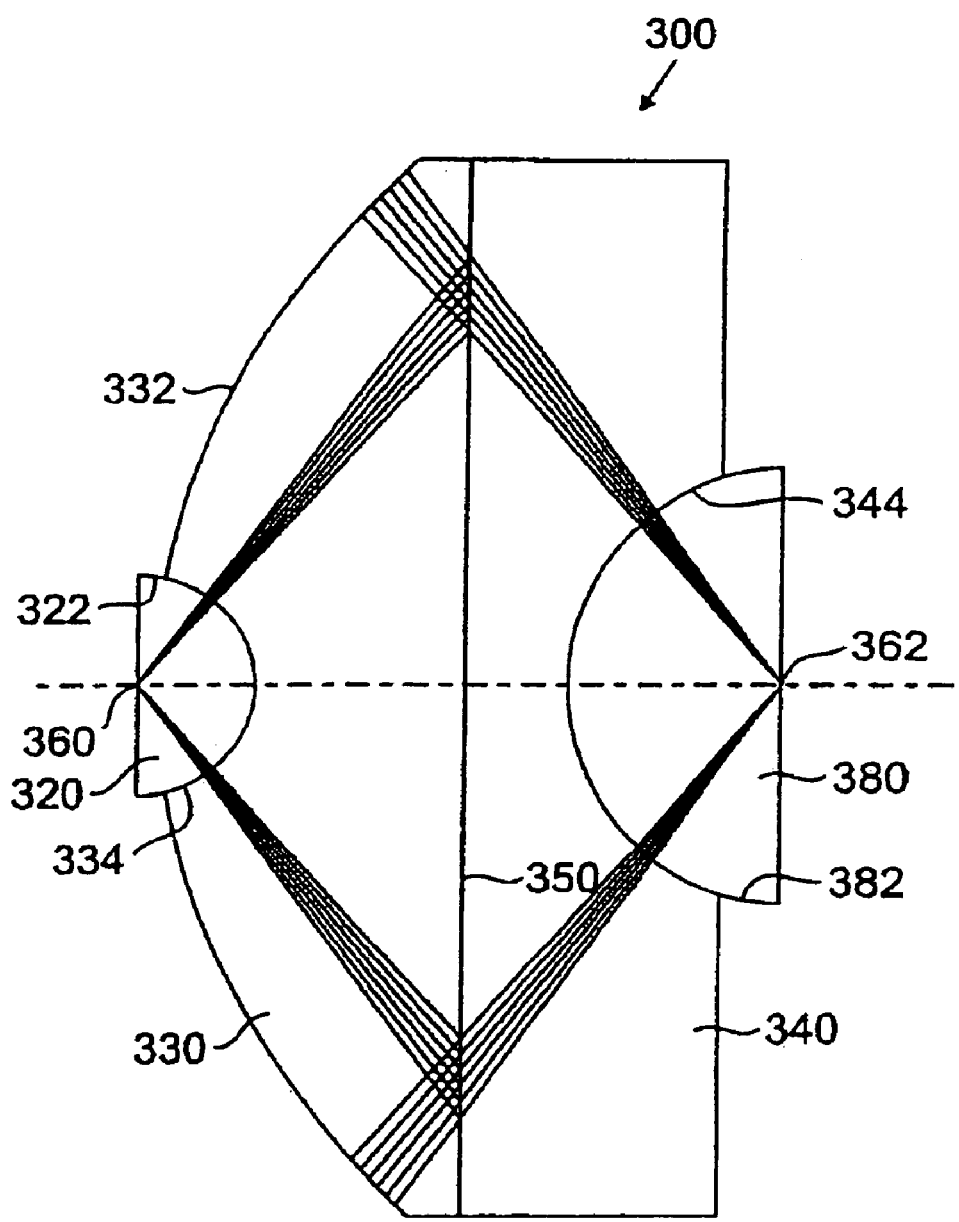
FIG. 3 is a schematic drawing of a catadioptric imaging system including a reflective surface, a beam splitter, and two refractive surfaces.

Referring to FIG. 3, a catadioptric imaging system 300 includes an object point 360, an image point 362, a beam splitter 350, a curved reflective surface 332, a plano-concave-convex element 330, a plano-concave element 340, and plano-convex elements 320 and 380. The common center of curvature for surface 322 of element 320 is the object point 360. The common center of curvature for surface 344, surface 332 of element 330, and surface 382 of element 380 is image point 362. Element 320 and element 330 are formed such that the radius of curvature of surface 322 of element 320 is substantially the same as the radius of curvature of surface 334 of element 330. Element 340 and element 380 are formed such that the radius of curvature of surface 344 of element 340 is substantially the same as the radius of curvature of surface 382 of element 380. Surfaces 322 and 344 are preferably coated with an antireflection coating.

The refracting surfaces in system 300 provide additional degrees of freedom that can be used to reduce optical aberrations in the image field. In particular, any of the index of refraction of elements 320, 380, 340 and the radius of curvature of surface elements 334, 344, 332 may be varied to reduce such aberrations. For example, optical ray tracing methods may be used to calculate the amplitude of the various aberrations as functions of such variables and in this way particular values of the parameters can be found that minimize the aberrations. Such optimizations may also take into account other design criteria such as magnification, planarity of the image field, numerical aperture, optical absorption and other material limitations. Notably, for example, the numerical aperture of system 300 scales with the index of refraction of the element 320. Thus, by use of a high index material, the numerical aperture can be improved. Moreover, an optimization may fix the indices of refraction for elements 320, 330, 340, and 380 simply because specific materials are to be used for these elements.

In some embodiments, element 380 or element 320 may be excluded. Elements 380 or 320 may be replaced by a void to be filled with a gas, liquid or vacuum. In some embodiments only one refractive surface may be used. In such cases, the index of refraction of element 380 or 320 matches the index of elements 330 and 340 such that interface 322/334 or 344/382 is no longer a refractive surface. Use of a void provides access to the image point or object point. Such access may be useful, for example, to position a detector near the image point.

As described above, the light intensity at the image point for imaging system 100, 200, and 300 are proportional to $T(\phi)R(\phi)=0.25-\delta^2$. Even in the ideal case, where $\delta=0$, only 25% of the available light reaches the image point.

Figure 4:
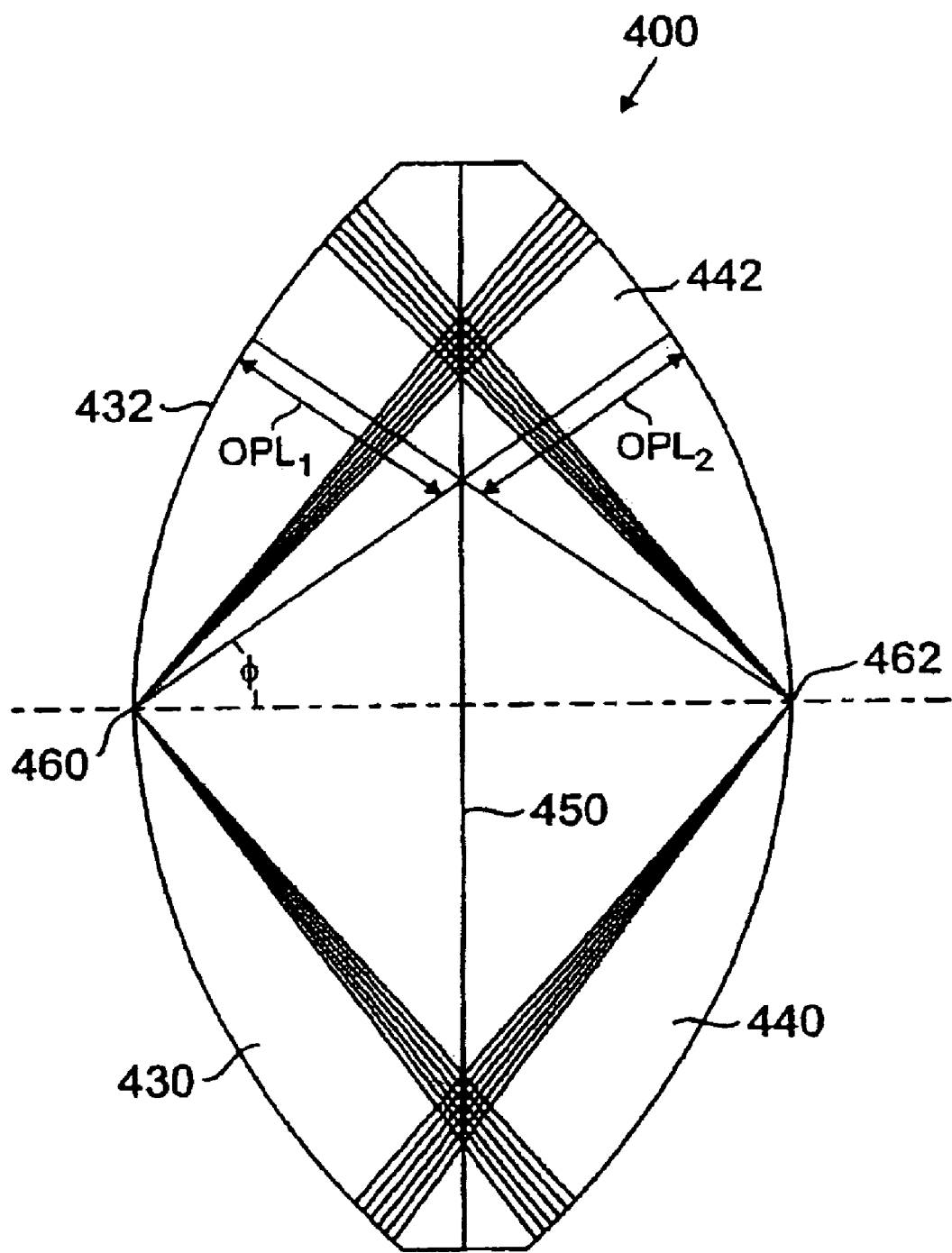
FIG. 4 is a schematic drawing of a catoptric imaging system including two reflecting surfaces constructed and positioned such that interferometric effects lead to increased light intensity at the image point.

Referring to FIG. 4, a catoptric imaging system 400 includes an object point 460, an image point 462, a beam splitter 450, a curved reflective surface 432, a curved reflective surface 442 and plano-convex elements 430 and 440. The reflective surface 442 is constructed such that light rays emanating from the object point 460 are focused to the image point 462 by following the path: i) the light emanates from the object point; ii) is transmitted by the beam splitter 450; iii) is reflected by surface 432; iv) is reflected by the beam splitter 450; v) is incident onto the image point 462. This can be accomplished by designing curved surface 442 to be concentric with the object point 460. Similarly the reflective surface 432 is constructed such that light rays emanating from the object point are focused to image point 462 by following the path: i) the light emanates from the object point; ii) is reflected by the beam splitter 450; iii) is reflected by surface 432; iv) is transmitted by beam splitter 450; and v) is incident onto the image point 462. This can be accomplished by designing curved surface 432 to be concentric with the image point 462.

In the embodiment described for FIG. 4, both the initially reflected and initially transmitted beams from the beam splitter are used. A beam is split by beam splitter 450 into two portions that are then reflected by surfaces 432 and 442, respectively, back to the same point on the beam splitter. Generally, the two portions recombine interferometrically to produce two new beams. One beam is directed to the image point 462 and the other is directed to the object point 460. The intensities of the respective beams depend on the difference in optical path length for the beam portions reflected from surfaces 432 and 442. FIG. 4 labels the two optical paths for the portions as OPL1 and OPL2. The optical path lengths for the portions corresponding to each ray are matched such that the two beams interfere constructively to direct all of the optical energy to the image point. Thus, the concentric curved surfaces 442 and 432 are positioned and shaped to agree to within a small fraction of a wavelength. Nonetheless, even where the optical path lengths are not exactly matched for all rays, the transmission to the image point can be enhanced relative to the earlier embodiments where transmission is limited to 25%.

The matched concentric curved surfaces 442 and 432 may be constructed using known techniques for fabricating precision surfaces. For example, a master set of reflecting surfaces 432 and 442 are constructed using high precision techniques for grinding spherical surfaces in conjunction with high precision metrology techniques. From the master set, replication techniques are employed to mass-produce copies of the surfaces. Such methods are commonly used to produce diffraction gratings. Furthermore, if there is some uncertainty in the resulting structures, testing can be used to retain only those copies that enhance transmission. Such testing may include the light transmission properties and surface profile measurements.

Figure 5:
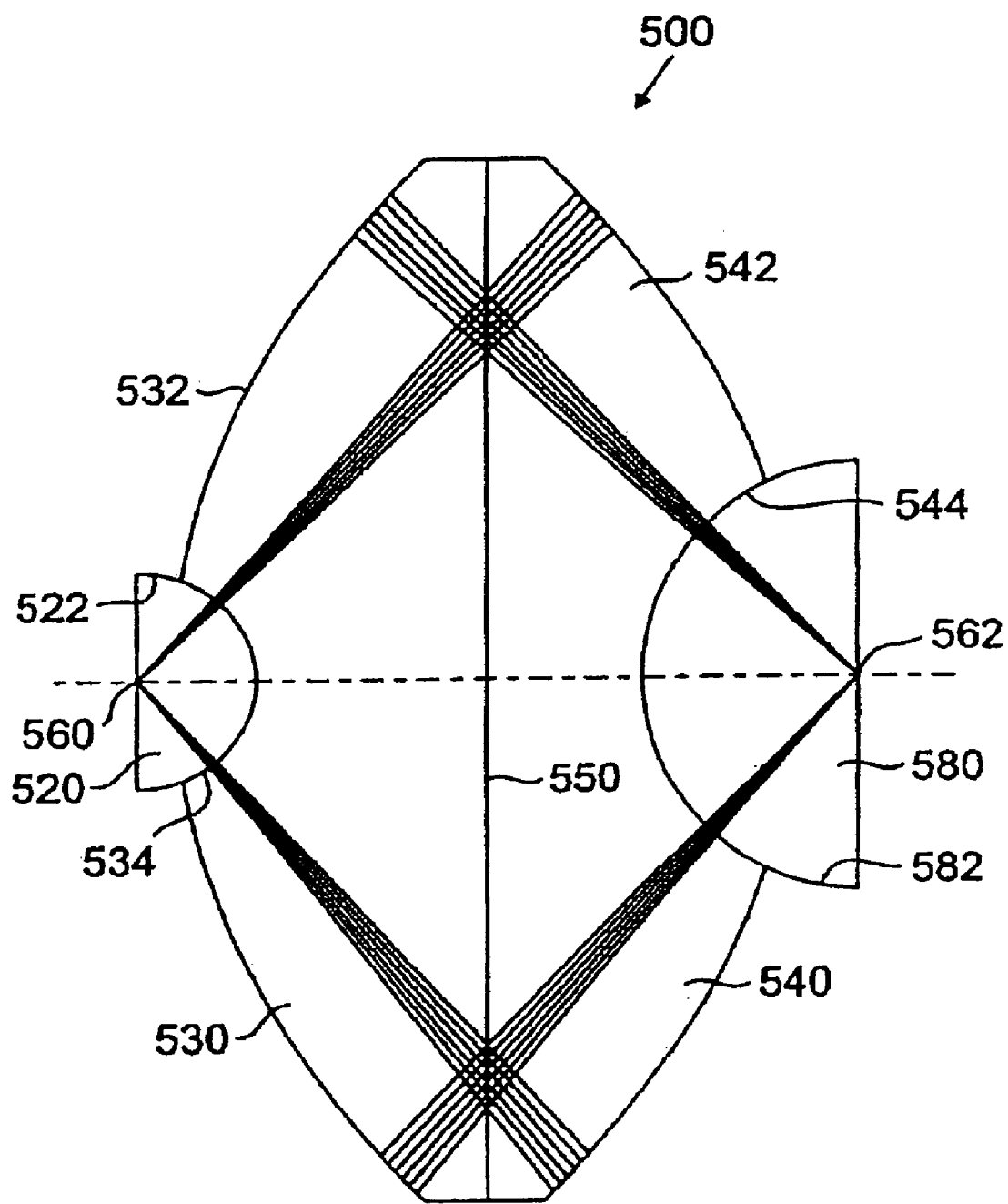
FIG. 5 is a schematic drawing of a catadioptric imaging system similar to the imaging system in FIG. 4 including refractive surfaces that reduce optical aberrations.

Similar to the discussion of imaging system 300, the object point of imaging system 400 is diffraction limited, but points in the vicinity of the object point may be distorted by aberrations. By the use of refractive surfaces it is possible to make these aberrations substantially zero for points in the object plane displaced from the object point. Referring to FIG. 5, an catadioptric imaging system 500 includes an object point 560, an image point 562, a beam splitter 550, a curved reflective surface 532 and 542, plano-concave-convex light transmitting elements 530 and 540, and plano-convex elements 520 and 580. Element 520 and element 530 are formed such that the radius of curvature of surface 522 of element 520 is substantially the same as the radius of curvature of surface 534 of element 530. Element 540 and element 580 are formed such that the radius of curvature of surface 544 of element 540 is substantially the same as the radius of curvature of surface 582 of element 580. In the described embodiment, the common center of curvature for surface 522 of element 520, for surface 534 of element 530, and for surface 542 of element 540 is the object point 560. Furthermore in the described embodiment the common center of curvature for surface 544 of element 540, for surface 532 of element 530, and for surface 582 of element 580 is the image point 562. Surfaces 522 and 544 are preferably coated with an antireflection coating. Furthermore, similar to the imaging system 400 of FIG. 4, the surfaces 542 and 532 are constructed such that light rays which are split by the beam splitter 550 recombine at a common point on beam splitter 550 and interfere constructively to enhance the light transmission to the image point 562.

In some embodiments, element 580 is composed of air. This allows for optical detection devices like CCD's to be positioned easily near the image point. The radii of curvature $r_{522}$, $r_{534}$, and $r_{544}$ of the refractive surfaces 522, 534, and 544, respectively, are chosen to minimize certain optical aberrations. Non-limiting examples of radii of curvature are shown in Table 1 for several different combinations of refractive materials with $r_{532}=r_{542}=50$ mm where $r_{532}$ and $r_{542}$ are the radii of curvature of surfaces 532 and 542, respectively. It is assumed that element 580 is air. Results of geometrical ray traces through systems employing the combination of refractive materials listed in Table 1 show that the images formed by the first embodiment are diffraction limited for an object field of 0.5 mm with an object space numerical aperture equal to 0.77 times the index of refraction of element 520 where $n_{520}$, $n_{530}$, and $n_{540}$ are the refractive indices of elements 520, 530, and 540, respectively.

In additional embodiments, the reflective surfaces in, for example, the embodiments of any of FIG. 4 or 5, may be reconfigured to produce an imaging system that images the object point to two spatially separated image points. The two image points may be displaced relative to each other along the optical axis, in a plane orthogonal to the optical axis, or a combination of both. Such embodiments may also be used in "reverse" to image two spatially separated object points to a common image point. The reconfiguration of the reflective surfaces may include, for example, adjusting their relative positions and/or changing their radius of curvature.

Figure 6:
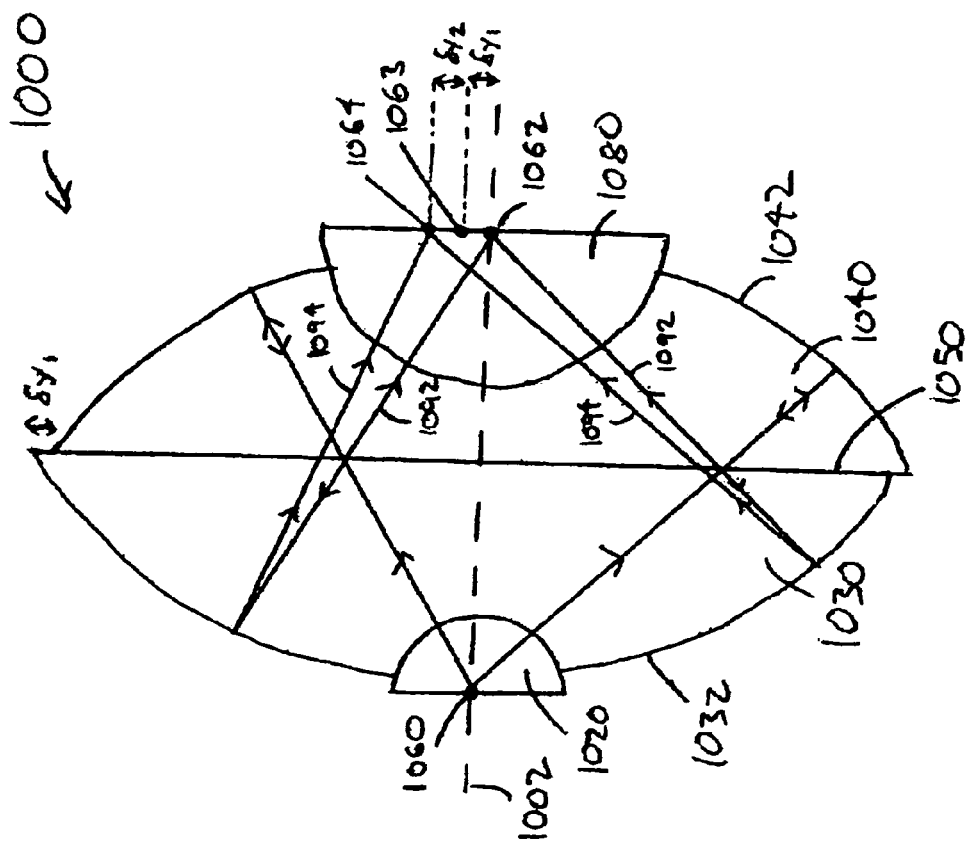
FIG. 6 is a schematic drawing of another catadioptric imaging system similar to the imaging system in FIG. 5 that generates two image points that are spatially separated in the transverse direction to the optical axis.

Referring to FIG. 6, a catadioptric imaging system 1000 is shown that is similar to system 400 of FIG. 5. System 1000 includes an object point 1060, spatially separated image points 1062 and 1064, a beam splitter 1050, curved reflective

TABLE 1

| Lens 520 | Element 530, 540 | $n_{520}$ (633 nm) | $n_{530}$, $n_{540}$ (633 nm) | $r_{522}$, $r_{534}$ (mm) | $r_{544}$ (mm) |
|---|---|---|---|---|---|
| GaP[a] | Fused Silica | 3.3079 | 1.4570 | 8.467 | 17.500 |
| BSO[b] | Fused Silica | 2.5500 | 1.4570 | 5.551 | 12.270 |
| YSZ[c] | Fused Silica | 2.1517 | 1.4570 | 3.000 | 6.720 |
| YAG[d] | Fused Silica | 1.8328 | 1.4570 | 2.997 | 16.030 |

[a]GaP: Gallium phosphide
[b]BSO: Bismuth silicon oxide, $Bi_{12}SiO_{20}$
[c]YSZ: Ytterbium stabilized zirconia, $ZrO_2$: 12% $Y_2O_3$
[d]YAG: Yttrium aluminum garnet, $Y_3Al_5O_{12}$ surfaces 1032 and 1042, plano-convex-concave light transmitting elements 1030 and 1040, and plano-convex elements 1020 and 1080. Element 1020 and element 1030 are formed such that the radius of curvature of surface 1022 of element 1020 is substantially the same as the radius of curvature of surface 1034 of element 1030. Beam splitter 1050 is oriented normal to an optical axis 1002 connecting object point 1060 to image point 1062. As in the embodiment of FIG. 5, the center of curvature of reflective surface 1042 coincides with object point 1060. Thus, a first set of rays 1092 corresponding to those rays from object point 1060 transmitted by beam splitter 1050 reflect from curved surface 1042 and then reflect from beam splitter 1050 to focus onto image point 1062.

However, in contrast to the embodiment of FIG. 5, the center of curvature 1063 of reflective surface 1032 is displaced from image point 1062 by an amount $\delta y_1$ along a direction normal to optical axis 1002, which corresponds to reflective surface 1032 being displaced by the amount $\delta y_1$ along the direction normal to optical axis 1002. As a result, a second set of rays 1094 corresponding to those rays from object point 1060 reflected by beam splitter 1050 reflect from curved surface 1032 and then transmit through beam splitter 1050 to focus onto image point 1064, which is displaced from center of curvature 1063 by an amount $\delta y_2 = \delta y_1$ along the direction normal to optical axis 1002. Thus, in system 1000 image points 1062 and 1064 are displaced from one another by an amount $2\delta y_1$ along the direction normal to optical axis 1002.

Additional elements 1020 and 1080 provide refracting surfaces selected minimize aberrations as described above. For simplicity, the effects of any such refraction are not shown in FIG. 6 with respect to the path of rays 1092 and 1094.

Figure 7:
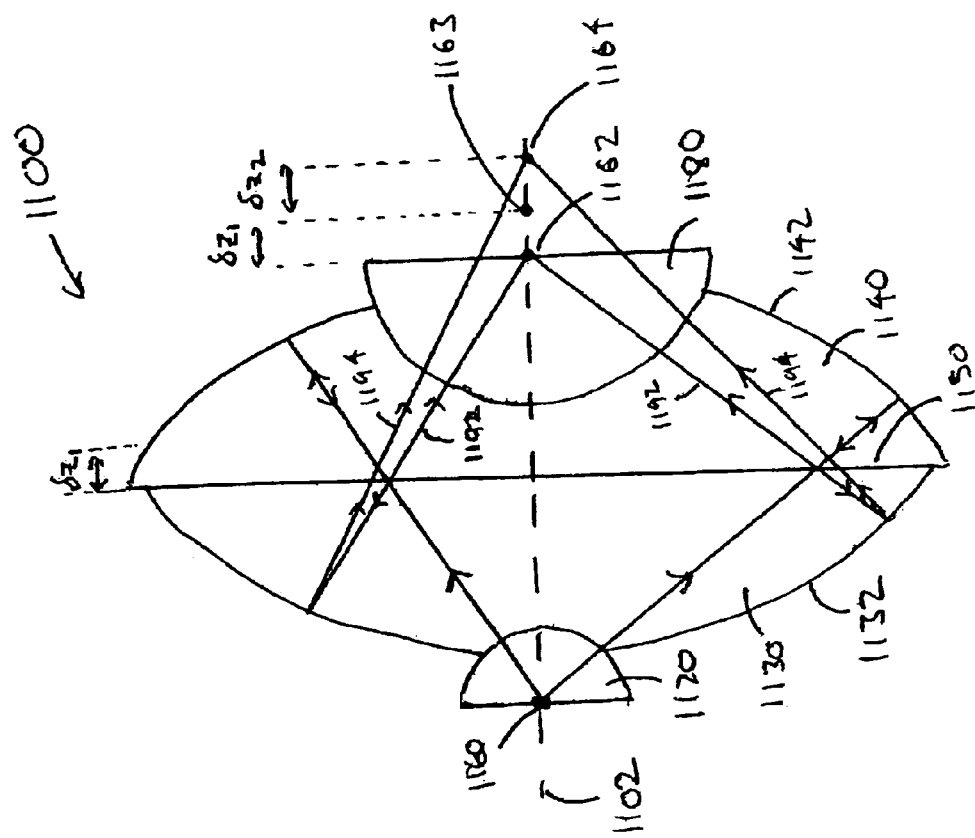
FIG. 7 is a schematic drawing of another catadioptric imaging system similar to the imaging system in FIG. 5 that generates two image points that are spatially separated in the longitudinal direction relative to the optical axis.

In another similar embodiment shown in FIG. 7, the center of curvature of one of the reflective surfaces is displaced along the optical axis.

Referring to FIG. 7, a catadioptric imaging system 1100 includes an object point 1160, spatially separated image points 1162 and 1164, a beam splitter 1150, curved reflective surfaces 1132 and 1142, plano-convex-concave light transmitting elements 1130 and 1140, and plano-convex elements 1120 and 1180. Element 1120 and element 1130 are formed such that the radius of curvature of surface 1122 of element 1120 is substantially the same as the radius of curvature of surface 1134 of element 1130. Beam splitter 1150 is oriented normal to an optical axis 1102 connecting object point 1160 to image point 1162. As in the embodiment of FIG. 4, the center of curvature of reflective surface 1142 coincides with object point 1160. Thus, a first set of rays 1192 corresponding to those rays from object point 1160 transmitted by beam splitter 1150 reflect from curved surface 1142 and then reflect from beam splitter 1150 to focus onto image point 1162.

However, in contrast to the embodiment of FIG. 5, the center of curvature 1163 of reflective surface 1132 is displaced from image point 1162 by an amount $\delta z_1$ along optical axis 1102, which corresponds to reflective surface 1132 being displaced by the amount $\delta z_1$ along optical axis 1102. As a result, a second set of rays 1194 corresponding to those rays from object point 1160 reflected by beam splitter 1150 reflect from curved surface 1132 and then transmit through beam splitter 1150 to focus onto image point 1164, which is displaced from center of curvature 1163 by an amount $\delta z_2$ along optical axis 1102. The amounts $\delta z_1$ and $\delta z_2$ are related to one another by the spherical lens formula $1/s_1 + 1/s_2 = 2/R$, where R is the radius of curvature of reflective surface 1132, $s_1 = R - \delta z_1$, and $s_2 = R + \delta z_2$. Thus, in system 1100 image points 1162 and 1164 are displaced from one another by an amount $\delta z_1 + \delta z_2$ along optical axis 1102.

Additional elements 1120 and 1180 provide refracting surfaces selected minimize aberrations as described above. For simplicity, the effects of any such refraction are not shown in FIG. 7 with respect to the path of rays 1192 and 1194.

In further embodiments, the reflective surface may be displaced both by an amount $\delta y_1$ along a direction normal to the optical axis and by an amount $\delta z_1$ along optical axis 1102. In such embodiments, the longitudinal displacement of the second image point is the same, however, the transverse displacement further includes a magnification factor $M = s_2/s_1$, in which case $\delta y_2 = M \delta y_1$.

In yet further embodiments, the other of the reflective surfaces may be displaced, or both surfaces may be displaced. Furthermore, the radius of curvature of one or both of the reflective surfaces may be modified, which have a similar effect as that of the longitudinal displacement described with reference to FIG. 7.

In additional embodiments of the catoptric systems described herein, one or both of the reflective surfaces in any of the embodiments described above, may be a Fresnel mirror. As defined above, a Fresnel mirror is a reflecting surface formed by multiple curved facets each having a common center of curvature.

Figure 8:
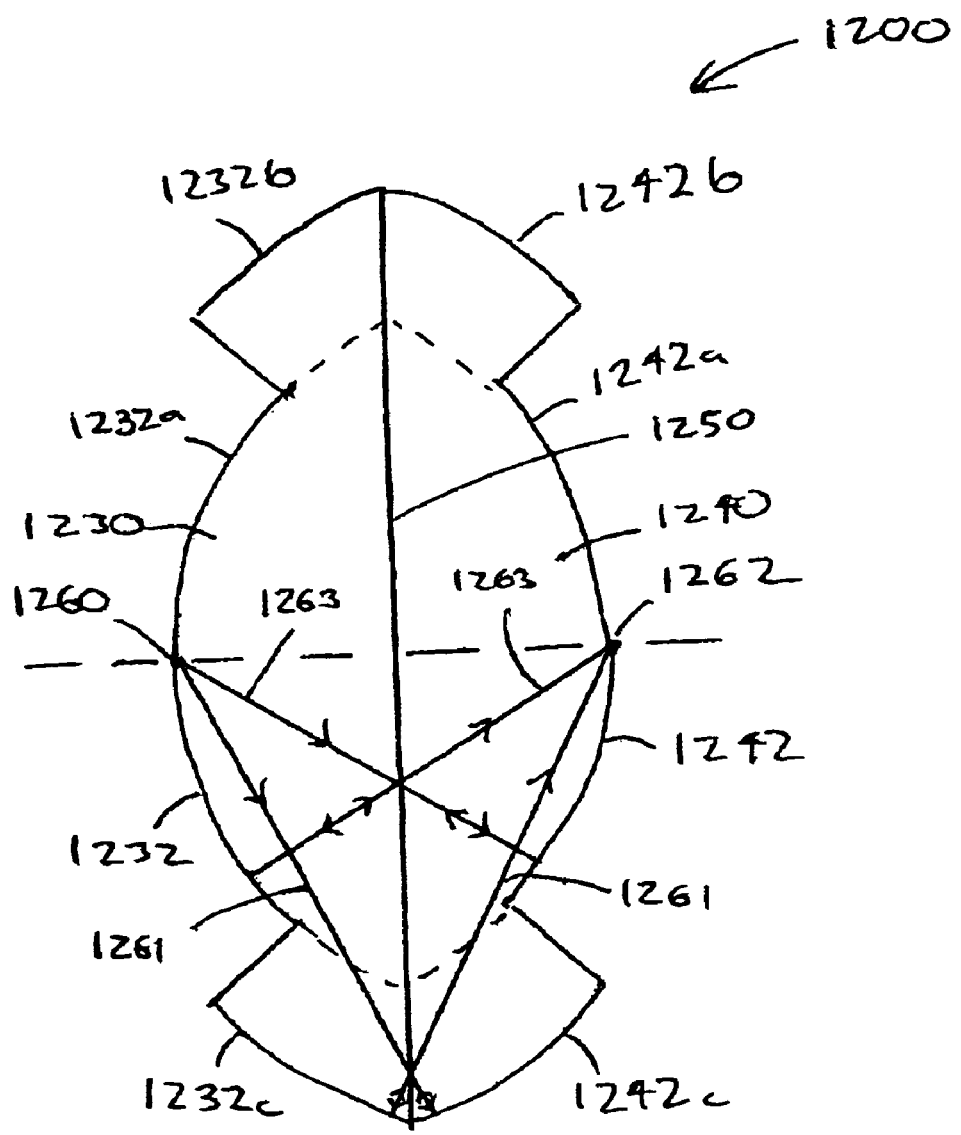
FIG. 8 is a schematic drawing of a catadioptric imaging system similar to the imaging system in FIG. 4 but including refractive surfaces that are Fresnel mirrors.

Referring to FIG. 8, for example, a catadioptric imaging system 1200 includes an object point 1260, image point 1262, a beam splitter 1250, curved reflective surfaces 1232 and 1242, and plano-convex-concave light transmitting elements 1230 and 1240. System 1200 is similar to that of FIG. 4, except both of the reflective surfaces are Fresnel mirrors. In particular, reflective surface 1232 includes curved facets 1232a, 1232b, and 1232c, which each have a common center of curvature at image point 1262. Facets 1232b and 1232c may be fabricated, for example, as an outer annular section of a lens having a surface with the same radius of curvature as facet 1232a. Similarly, reflective surface 1242 includes curved facets 1242a, 1242b, and 1242c, which each have a common center of curvature at object point 1260. Furthermore, facets 1242b and 1242c may be fabricated, for example, as an outer annular section of a lens having a surface with the same radius of curvature as facet 1242a.

Referring still to FIG. 8, implementing the Fresnel mirrors allows oblique rays emerging from object point 1260, such as rays 1261, to be imaged to image point 1262 in addition to less oblique rays such as rays 1263. In contrast, oblique rays 1261 would not be imaged to the image point by the system if it only included central facets 1232a and 1242a (as indicated by the dashed lines extending facets 1232a and 1242a). Thus, implementing the Fresnel mirrors increases the numerical aperture and working distance of the system.

Figure 9:
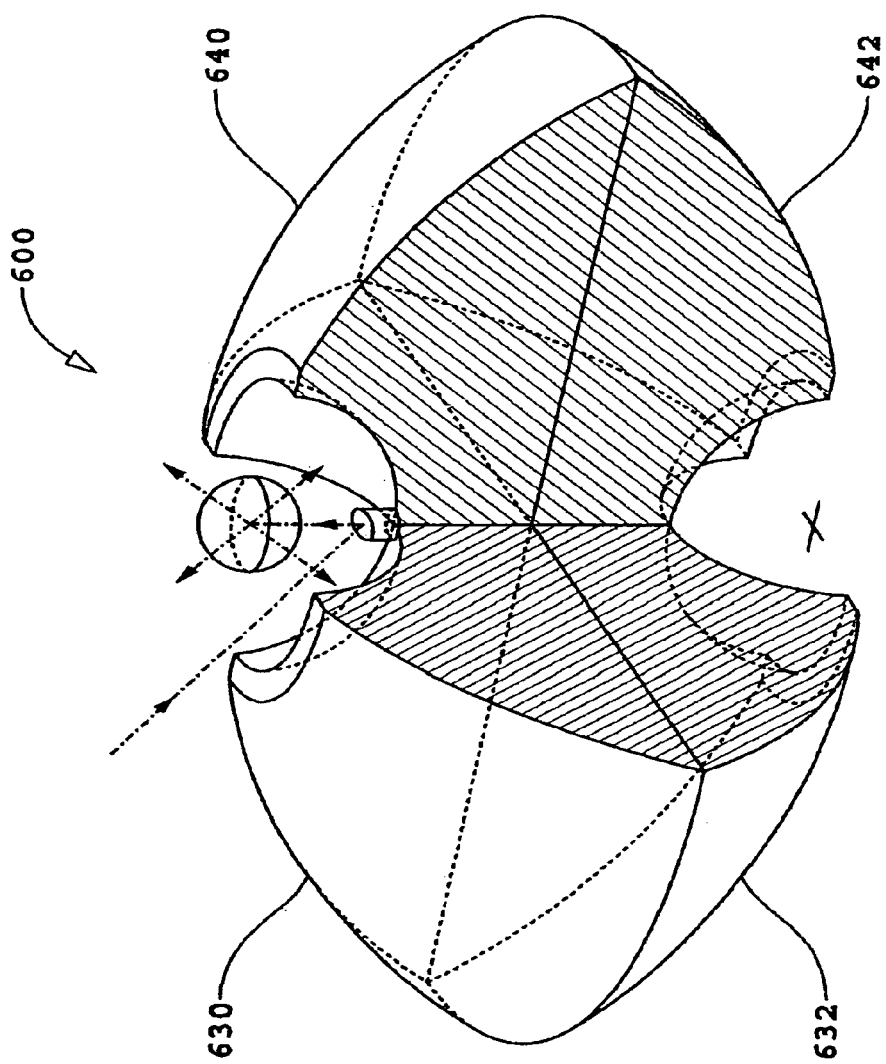
FIG. 9 is a perspective drawing of a catadioptric imaging system.

In each of the embodiments, the requirements for matched elements with respect to tolerances on radii of curvature, thickness of plano-convex elements, thickness of a plano-concave-convex element, and lateral shears of elements are typically associated with respect to a pair of elements or a set of four elements that have pie-sections as apertures such as shown in perspective drawing in FIG. 9 for catadioptric imaging system 600. System 600 comprises elements 630, 632, 640, and 642 and each of the four elements represents a 45 degree pie-section. Elements 630, 632, 640, and 642 are constructed by cutting a single element, such as element 530 shown in FIG. 5, into four sections. In general, that starting element is a catadioptric lens element that includes a planar bottom surface and an upper surface having a convex reflective portion and a concave refractive portion, with both the convex and concave portions sharing a common axis of symmetry (typically, they are spherical or substantially spherical surfaces). As a consequence of the way they are produced, the elements 630, 632, 640, and 642 have the same radii of curvature and thickness of the plano-convex-concave dimension to the same accuracy that the surface 532 shown in FIG. 5 can be manufactured, e.g., $\lambda/10$.

Figure 10:
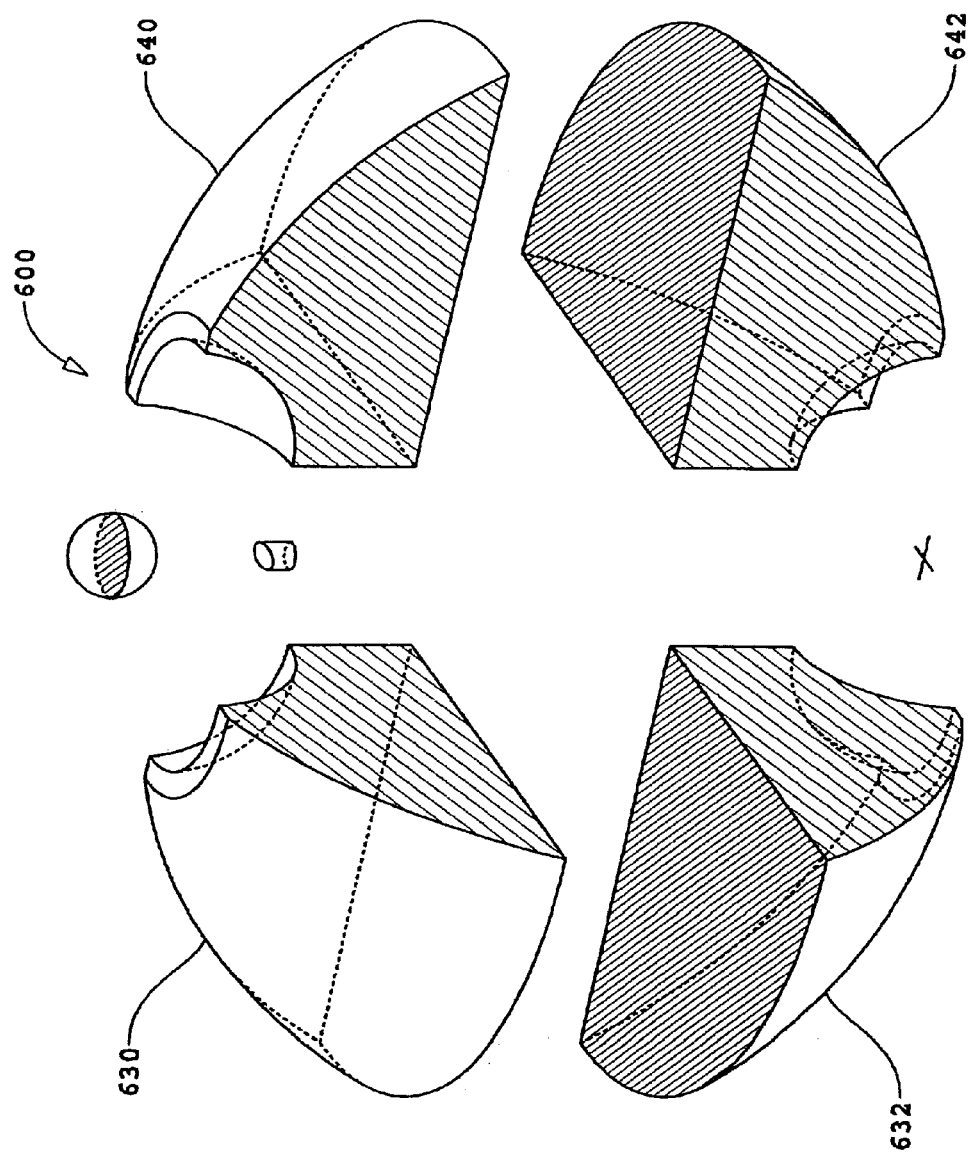
FIG. 10 is a perspective drawing of a catadioptric imaging system with the elements separated for purposes of illustration.

FIG. 10 shows the catadioptric system of FIG. 9 with the elements separated in order to display the features more clearly.

The use of matched pie-sections is of particular value in ellipsometric interferometric applications of the catadioptric imaging system such as described in the above-mentioned U.S. Provisional Application entitled "Joint Measurement Of Fields Of Orthogonally Polarized Beams Scattered/Reflected By An Object In Interferometry." The pie-sections may comprise sections with angles less than 45 degrees.

The relative radii of curvature of elements 630, 632, 640, and 642 may be modified by a fraction $\lambda$ or of the order of $\lambda$ with the deposition of a thin layer on the respective concave or convex surfaces. Also the thickness of the plano-convex-concave dimension of elements 630, 632, 640, and 642 may be modified by a fraction $\lambda$ or of the order of $\lambda$ with the deposition of a thin layer on the respective plano surfaces. The addition of the thin layers would serve for example the purpose of introducing a $\pi/2$ or $\pi$ phase shift in a measurement beam.

In catadioptric imaging system comprising pie-sections such as shown in FIG. 6, the construction method described herein easily accommodates the introduction of lateral shears of elements 630, 632, 640, and 642 as desired in an end use application.

The use of matched pie-sections of a catadioptric imaging system also has the additional advantage of permitting two or more different matched pie-sections having different properties, e.g., numerical apertures, different $\pi/2$ or $\pi$ phase shifts in a measurement beam, and/or different operating wavelengths.

Other embodiments are within the following claims.

What is claimed is:

1. A method of fabricating a lens system, said method comprising:
    fabricating a single lens element having a bottom surface and an upper surface;
    cutting apart the lens element to form 2n pie-shaped segments, wherein n is an integer; and
    reassembling the 2n pie-shaped segments to form the lens system with n of the 2n pie-shaped segments being located above a common plane and the rest of the 2n pie-shaped elements being below the common plane.

2. The method of claim 1 wherein cutting the lens element to form the 2n pie-shaped segments is accomplished by cutting along a set of planes each of which contains a common axis.

3. The method of claim 1 wherein the 2n pie-shaped segments are identically shaped.

4. The method of claim 1 wherein n=1.

5. The method of claim 1 wherein n=2.

6. The method of claim 5 wherein each of the four pie-shaped segments is a 90° segment of the single lens element.

7. The method of claim 1 wherein reassembling involves arranging each of the n pie-shaped segments that are above the common plane to be opposite to and aligned with a corresponding different one of the n pie-shaped segments that are below the common plane.

8. The method of claim 1 wherein reassembling the four pie shaped segments relative to a common plane involves placing two of the four segments are above the plane with their bottom surfaces being substantially parallel to and facing the common plane and placing the other two of the four segments are below the common plane with their bottom surfaces substantially parallel to and facing the common plane.

9. The method of claim 8 wherein reassembling also involves orienting the four segments so that each one of the two segments above the common plane are aligned with and adjacent to a corresponding one of the two segments that are below the common plane.

10. The method of claim 9 wherein reassembling further involves orienting the two segments that are above the common plane so that they share an axis of symmetry and are radially opposite each other relative to that shared axis of symmetry.

11. The method of claim 1, wherein the single lens element is a catoptric lens element.

12. The method of claim 1, wherein the single lens element is a catadioptric lens system.

13. The method of claim 12, wherein the upper surface of the lens element includes a convex portion and a concave portion, both the convex and concave portions sharing a common axis of symmetry.

14. The method of claim 1, wherein the single lens element comprises a Fresnel surface.

15. The method of claim 13 wherein the convex portion is a reflective portion of the catadioptric lens element and the concave portion is a refractive portion of the catadioptric lens element.

16. A method of fabricating a lens system, said method comprising:
   fabricating a single lens element having a bottom surface and an upper surface;
   cutting apart the lens element to form two identically pie-shaped segments; and
   reassembling the two pie-shaped segments to form at least part of the lens system with one of the two pie-shaped segments being located above a common plane and the other of the two pie-shaped elements being below the common plane, wherein the bottom surfaces of the two pie-shaped elements are facing each other and substantially parallel to the common plane, and wherein the two pie-shaped segments are aligned with each other.

17. The method of claim 16 wherein cutting the lens element to form the two pie-shaped segments is accomplished by cutting along a plane that contains a common axis.

18. The method of claim 16, wherein the single lens element is a catoptric lens element.

19. The method of claim 16, wherein the single lens element is a catadioptric lens element.

20. The method of claim 19, wherein the upper surface of the lens element includes a convex portion and a concave portion, both the convex and concave portions sharing a common axis of symmetry.

21. A method of fabricating a lens system, said method comprising:
   fabricating a single lens element having a bottom surface, an upper surface, and an axis of rotational symmetry;
   cutting apart the lens element to form four substantially identical segments, wherein cutting involves cutting the element along at least one plane that contains the axis; and
   reassembling the four segments to form the lens system with two of the four segments being located above a common plane and the other two of the four elements being below the common plane, wherein the reassembled four segments have their bottom surfaces substantially parallel to the common plane, and wherein each of the two segments that is above the plane is aligned with and adjacent to a corresponding different one of the two segments that are below the common plane.

* * * * *